United States Patent
Linning

[15] 3,680,627
[45] Aug. 1, 1972

[54] FLEXIBLE SUPPORT WALL FOR TUBE-IN-SHELL HEAT EXCHANGER

[72] Inventor: David Lees Linning, Fernhead, near Warrington, England

[73] Assignee: United Kingdom Atomic Energy Authority, London, England

[22] Filed: March 19, 1970

[21] Appl. No.: 20,903

[30] Foreign Application Priority Data

March 26, 1969  Great Britain.........15,899/69

[52] U.S. Cl. .....................165/162, 176/65, 176/78
[51] Int. Cl. ..............................................F28d 7/00
[58] Field of Search.............176/40, 65, 78, 85, 87; 165/162, 69, 172, 178

[56] References Cited

UNITED STATES PATENTS

| | | | |
|---|---|---|---|
| 3,260,650 | 7/1966 | Kalk et al.....................176/85 X |
| 3,180,799 | 4/1965 | Blake..........................176/40 X |
| 3,124,514 | 3/1964 | Koutz et al..................176/40 X |

FOREIGN PATENTS OR APPLICATIONS

| | | | |
|---|---|---|---|
| 607,717 | 9/1948 | Great Britain................165/172 |
| 153,613 | 3/1956 | Sweden........................165/172 |

*Primary Examiner*—Frederick L. Matteson
*Assistant Examiner*—W. C. Anderson
*Attorney*—Larson, Taylor and Hinds

[57] ABSTRACT

A heat exchanger of the "tube-in-shell" has the tubes in its tube bundle spaced apart by wire wrapping. An annular flexible member located on the inside wall of the heat exchanger shell surrounds the tube bundle. An interspace is defined between the annular flexible member and the inside surface of the heat exchanger shell. The end of the interspace facing flow of fluid through the shell is open so that the fluid has access to the interspace the other end of which is closed. The pressure of the fluid in the interspace expands the flexible member radially inwards to apply a centripetal loading on the tube bundle.

9 Claims, 4 Drawing Figures

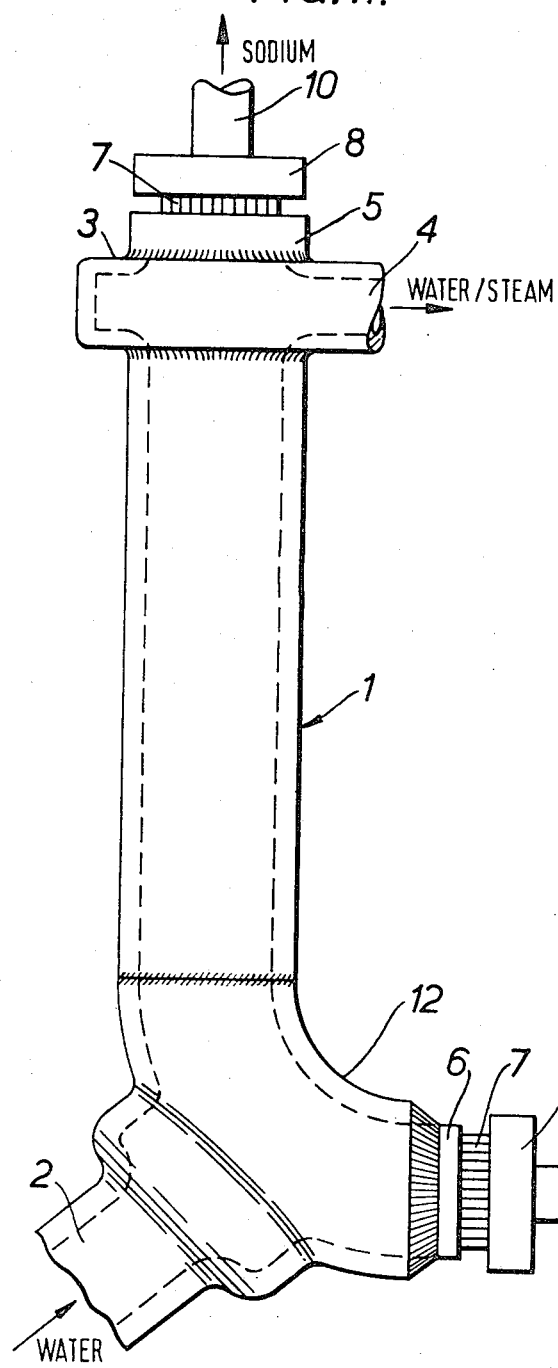
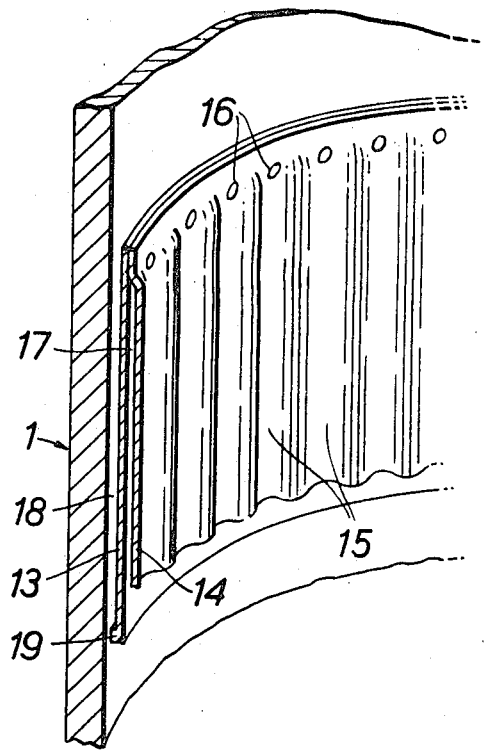

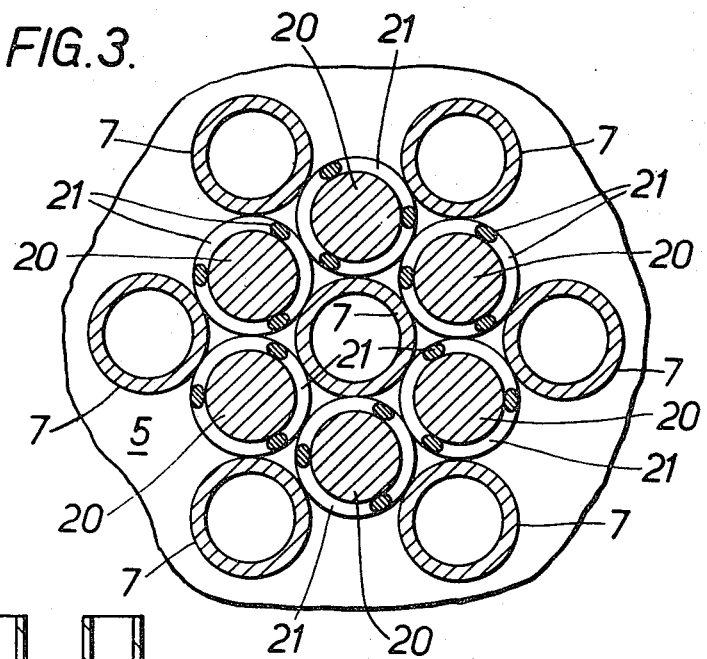
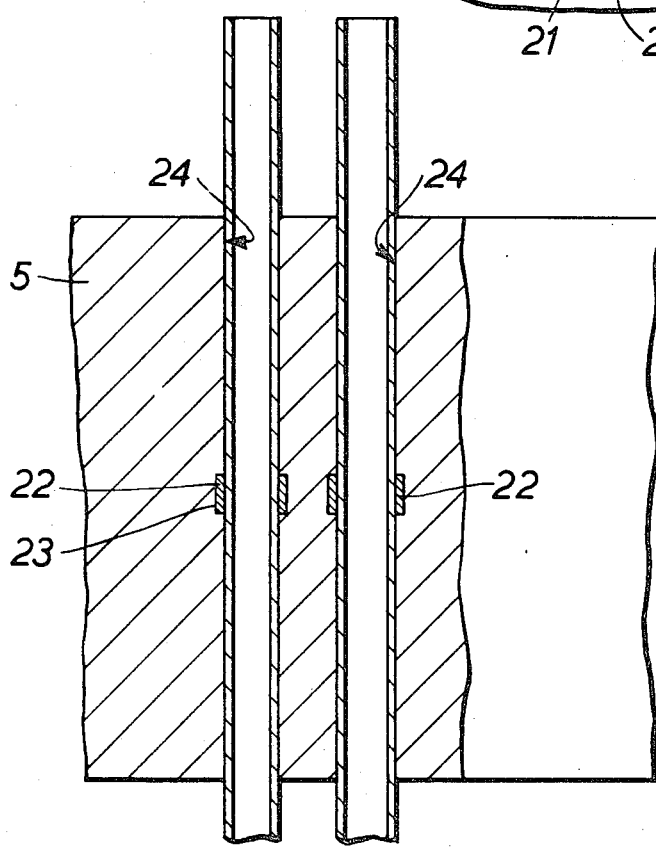

FLEXIBLE SUPPORT WALL FOR TUBE-IN-SHELL HEAT EXCHANGER

BACKGROUND OF THE INVENTION

This invention relates to heat exchange means and relates in particular to such heat exchange means including a bundle of cylindrical members arranged with their longitudinal axes parallel, a fluid being passed in heat exchange relationship over the surface of the cylindrical members.

An example of such a heat exchange means is a nuclear reactor fuel element comprising a bundle of nuclear fuel pins arranged with their longitudinal axes parallel within an outer container or wrapper. In use of such a fuel element in a nuclear reactor coolant fluid is passed through the container or wrapper over the surface of the fuel pins the coolant fluid becoming heated by heat transfer from the fuel pins. It is customary in such fuel elements, to provide transverse spacer grids at positions spaced along the whole length of the fuel pins. The fuel pins extend through the spacer grids which provide transverse support and spaced location for the fuel pins. Such spacer grids are required to prevent lateral vibration of the fuel pins and to provide the correct spacing of the fuel pins relative to each other. Uneven transverse spacing of the fuel pins leads to bad coolant flow distribution and inefficiency. However the provision of such spacer grids gives rise to its own problems; for example that of achieving fuel pin-spacer grid contact without fuel pin wear under varying temperature conditions.

Another form of heat exchange means including a bundle of cylindrical members arranged with their longitudinal axes in parallel is that type of heat exchanger, known as "tube-in-shell" in which a cluster of parallel heat exchange tubes sealed in a tube plate at each end of the cluster is disposed in a shell or container to which the tube plates are secured, one fluid medium occupying the tubes and another fluid medium occupying the container.

It has been customary in heat exchangers of the kind specified in the previous paragraph to provide, at positions between the tube plates and spaced along the whole length of the tubes, grids through which the tubes extend, such grids providing transverse support and spaced location for the tubes. Such grids are required to prevent vibration and to provide the correct spacing of tubes relative to each other. Uneven transverse spacing of tubes leads to bad flow distribution and inefficiency. However the provision of grids gives rise to its own problems; for example that of achieving tube-grid contact without tube wear under varying temperature conditions.

SUMMARY OF THE INVENTION

According to the invention heat exchange means comprises a bundle of cylindrical members arranged with their longitudinal axes parallel, such that a fluid can be passed in heat exchange relationship over the surface of the cylindrical members, spacing means for spacing the cylindrical members transversely apart contacting between the cylindrical members, a support member having a flexible wall being arranged longitudinally with respect to the cylindrical members and means for applying fluid pressure to the flexible wall of said support member to apply a transverse loading on the cylindrical members, thereby loading the cylindrical members transversely together with the spacing means whereby transverse support and location is provided for the cylindrical members.

In a particular arrangement the pressure of fluid flowing over the surface of the cylindrical members is caused to act on the flexible wall of the support member.

The support member may comprise a hollow body having an open end facing the direction of flow of fluid over the cylindrical members, at least one longitudinal wall of the support member being of flexible form, fluid having access to the inside of the support member through the open end thereof acting on the inside surface of the flexible wall of the support member.

In a preferred arrangement wherein the cylindrical members are arranged in an outer container, fluid being passed under pressure through the outer container in heat exchange relationship over the surface of the cylindrical members, said flexible member is of annular form and is arranged around the inside of the outer container surrounding the bundle of cylindrical members, an interspace being defined between the flexible member and the inside surface of the outer container, the end of the interspace facing the direction of flow of fluid through the container being open for access of fluid into the interspace, the other end of the interspace being closed whereby the pressure of fluid acting in the interspace expands the flexible member radially inwards to cause it to contact the outermost cylindrical members of the bundle and thereby to exert an inwards force on the bundle.

The invention is applicable in a heat exchanger of the "tube-in-shell" type comprising a bundle of tubes arranged with their longitudinal axes parallel in an outer container and for effecting heat transfer between two flowing media, one flowing through the tubes and the other flowing over the tubes longitudinally through the outer container, the tubes in the bundle being spaced from one another by spacing means contacting between the tubes at spaced intervals along their length, a flexible member embracing the bundle of tubes and means for applying fluid pressure to said flexible member to cause it to contact the outermost tubes of the bundle and thereby exert inward force on the bundle, whereby transverse support and location is provided for said tubes.

In such a heat exchanger the flexible member may be of annular form, being fitted around the inside surface of the outer container surrounding the bundle of tubes, an interspace being defined between the flexible member and the inside surface of the outer container, the end of the interspace facing the direction of flow of fluid through the outer container being open for access of said fluid into the interspace, the other end of the interspace being closed whereby the pressure of fluid acting in the interspace expands the flexible member radially inwards to cause it to contact the outermost tubes of the bundle and thereby exert an inwards force on the bundle.

DESCRIPTION OF THE DRAWING

An embodiment of the invention will now be described by way of example with reference to the accompanying drawings in which:

FIG. 1 is a side view of a heat exhanger,

FIG. 2 is a fragmentary, enlarged perspective view of part of the shell of the heat exchanger shown in FIG. 1.

FIG. 3 is a fragmentary, enlarged plan view in section and from beneath, showing the upper tube plate, and FIG. 4 is a fragmentary side view in section of the upper tube plate.

DESCRIPTION OF THE PREFERRED EMBODIMENT

Referring to the drawings, the invention is shown applied by way of example to a sodium/water heat exchanger which can be employed for steam-raising in connection with a fast breeder power producing nuclear reactor. The sodium is pumped in a secondary circuit consisting of one side of a primary heat exchanger of the nuclear reactor and one side of the illustrated heat exchanger; such secondary circuit may also include a steam superheater, and a reheater associated with a multistage steam turbine. The steam raising unit (FIG. 1) consists generally of a circular-section pressure shell 1, a water inlet 2 to the lower end of the shell 1, a steam and water header 3 and outlet 4 at the upper end of the shell 1, tube plates 5, 6 at the upper and lower ends respectively of the shell 1, heat exchange tubes 7 in cluster form and penetrating the tube plates 5, 6, sodium headers 8, 9 in communication with the upper and lower ends respectively of tubes 7, a sodium outlet 10 from the header 8, and a sodium inlet 11 to the header 9, i.e. the sodium flows in co-current flow relationship to the water/steam. The lower end portion 12 of the shell 1 is curved through a right angle from the remainder of shell 1; the cluster of tubes 7 is similarly curved to follow the curved portion 12 of shell 1.

Referring now to FIG. 2, which shows a portion of the wall of the shell 1 in the vertically orientated part thereof but in which the tube cluster is omitted, there is disposed inside the shell 1 an assembly consisting of an annular plate 13 having secured to its upper end edge by seam welding the upper end edge of an annular flexible member 14, the latter being spaced from the plate 13 over the major portion of its length. The member 14 is longitudinally corrugated to provide curved depressions 15 which register with and contact the outermost row of heat exchange tubes of the cluster of tubes 7. Bleed holes 16 communicate between the cluster volume and the interspace 17 which exists between the plate 13 and member 14, the interspace 17 being fully open at its lower end, the flexible member 14 terminating short of the plate 13 at their lower ends. There is also an interspace 18 between the plate 13 and the wall of shell 1; a throttling ring 19 at the lower edge of plate 13 serves to restrict flow in the interspace 18. The assembly shown in FIG. 2 is repeated above and below, with the top edge of plate 13 abutting the bottom edge of the annular plate of the next superposed assembly and the bottom edge of plate 13 abutting the top edge of the annular plate 13 of the next assembly beneath, and so on. The assemblies are provided over all the vertical part of shell 1, the tubes 7 being supported by other means such as a grid or grids over their curved portions which follow the portion 12 of shell 1. Some support in this region is necessary because of transverse flow from water inlet 2.

It is not essential for the flexible member 14 and plate 13 to be annular, although it is advantageous in that the inward force on the tube cluster is centripetal. However, where the pitching of the heat exchange tubes 7 is triangular, which is the most convenient in practice and provides regularity for spacing purposes, it may be more convenient to provide panels of assembled flexible members 14 and plates 13 arranged so that the panels form a polygon (e.g. a hexagon), with the panels secured together edgewise at the corners. The pressure shell 1 in this case remains circular in cross-section, but the throttling rings 19 instead of being of constant width increase in width to their midpoints and then decrease, with their outer edges curved to follow the curvature of the shell 1 while retaining a constant throttling spacing therefrom.

FIG. 3 shows a part of the upper tube plate 5 as seen from beneath, and a part of the cluster of tubes 7 which in this case are concentrically pitched, though as has been mentioned they may have other pitchings, particularly triangular. The tubes 7 are of relatively small outside diameter (e.g. 0.31 inch) and consequently if closely spaced by contact between wirewrap and wirewrap or wirewrap and tube of adjacent tubes, insufficient tube plate ligaments may be provided where the shell fluid is at high pressure. To provide sufficiently strong tube plate ligaments for high pressure application, spacing means between the tubes 7 are provided and consist of a plurality of dummy rods 20 disposed in concentric rows interposed in off-set manner between concentric rows of tube 7 in the manner shown in FIG. 2. Each dummy rod 20 has a three-start helical wirewrap 21 which contacts adjacent tubes 7 at recurring levels determined by the pitch of the helices, the wirewraps of adjacent rods 20 also contacting one another at recurring levels. The lower ends of the rods 20 terminate at the lower end of the vertical part of shell 1. Where the tube plate ligament situation is not so critical, i.e. where the shell pressure is not high, the rods 20 can be omitted and the tubes 7 are themselves wire wrapped and their pitching is such that at a given level, the wrap of one tube 7 contacts the tube surface, or alternatively the wirewrap, of an adjacent tube 7. The provision of wirewraps on the tubes 7 can be advantageous in protecting the tubes 7 from abrasion while retaining the function of providing flow distribution.

FIG. 4 shows how the tubes 7 of small outside diameter can be sealingly secured in the tube plate 5, there being a similar arrangement for the tubes 7 in tube plate 6. Tubes down to about three-eighth inch internal diameter can be successfully fusion welded to a tube plate, but below this dimension (e.g. the 0.31 inch O.D. tubes referred to earlier) another method is adopted. This consists of a combination of a rolled joint and a high temperature braze joint. Firstly a ring of braze metal 22 is rolled into groove 23 in each penetration 24 of the tube plate 5. Then a tube 7 is positioned in each penetration 24 and a cold rolling operation is performed to ensure contact between each tube 7 and the braze metal 22. The tube plate 5 is now raised to brazing temperature to make the brazed joint. Cold rolling on both sides of the brazed joint is then performed. It is advantageous to provide fine circumferential grooves in the outer wall of the tube 7 to improve axial location and ensure good sealing. The rolling on to the tube plate and the brazed joint produce separate seals which complement one another, furthermore the rolled joints on either side of the brazed joint protect the latter from mechanical forces which would otherwise tend to cause it to fail. Typically a reduction in wall thickness from 0.030 to 0.025 inch in the 0.25 inch I.D. tube is produced by the rolling process.

In operation, with a typical water/steam pressure of 2,652 lbs/sq. in., the annular flexible member 14 is deformed inwardly by the pressure in interspace 17 to exert a centripetal force on the outermost row of tubes 7, the pressure across the annular plate 13 being balanced by the pressure in interspace 18, the wall of shell 1 being unyielding. Due to the contact between tubes 7 and the wire wrap 21 of rods 20 (or contact between the wirewraps and tubes of adjacent tubes 7, as the case may be) at recurring levels, the cluster of tubes 7 will be transversely supported and located. The 90° bend of the tubes 7 at their lower end region provides for differential axial thermal expansion of the tubes 7 to be accommodated by elastic bending of the tubes, there being room for this because the tubes 7 are not subjected to said centripetal force in the said region.

Having the water/steam at high pressure in the shell 1 is advantageous in the case of a sodium/water heat exchanger, because, if a tube 7 should fail, water will be forced into the tube at the defect (since the sodium is only at pumping pressure), and the resulting reaction will be limited by the smallness of available reaction interface area together with rapid interposition between the two fluids of reaction products. Propagation of a tube fault is thus highly improbable. Reaction in a sodium header will therefore be limited to the water supplied by a single tube, and since the tube is of fine bore, this will impose still further limitation. Small diameter tubes are additionally advantageous in that a large surface area for heat transfer is provided, in a smaller compass, which enables the size of an installation to be reduced for an equivalent heat rating.

There follows a table of typical parameters for a conceptual design of heat exchanger substantially as described and illustrated.

| | |
|---|---|
| Heat Exchange Capacity | 112.3 M.W. |
| Temperatures | |
| Sodium Inlet | 466°C |
| Sodium Outlet | 374 |
| Water Inlet | 346 |
| Water Outlet | 356 |
| Pressures | |
| Water/Steam | 2652 p.s.i. |
| Mass Flow | |
| Sodium | $7.55 \times 10^6$ lb/hr |
| Water | $3.3 \times 10^6$ |
| Sodium Velocity | 40 f.p.s. |
| Water Mass Velocity | $2.5 \times 10^6$ lb/hr. ft$^2$ |
| Tube (7) Internal Diameter | 0.25 in. |
| Tube (7) Thickness | .030 in. |
| Wire Wrap (21) Thickness | .025 in. |
| Tube (7) Pitch | .528 in. |
| Number of Tubes (7) | 2940 |
| Dummy Rod (20) Diameter | .25 in. |
| Shell (1) Internal Diameter | 30 in. |
| Water Flow Area | 189 in$^2$ |
| Overall heat transfer coefficient (based on tube outer surface) | 1940 Btu/hr. °F.ft$^2$ |
| Required Heat Exchange Surface Area | 2780 ft$^2$ |
| Surface Area of Tubing (Outside Diameter) per ft. | 240 ft$^2$ |
| Required Effective Length of Unit | 11.5 ft. |
| Approx. Overall Length of Unit | 14 ft. |
| Main Shell (1) Thickness | 3.0 in. |
| Tube Plate (5, 6) Thickness | 10 in. |
| Tube Plate (5, 6) Thickness (if domed) | 5 in. |
| Overall Volume of Unit | 130 ft$^3$ |
| Sodium Pressure Drop | 125 p.s.i. |
| Water Pressure Drop | ~80 p.s.i. |
| Dry-out Margins | |
| At Water Inlet | 2.05 |
| At Water/Steam Outlet | 1.91 |
| Compressive Hoop Stress in Tubes | 13,700 p.s.i. |
| Axial Stress in Tubes | NIL |

Comparing with a typical sodium/water steam generator with larger tubes and conventional gridded tube supports and designed for an equivalent duty, there is a size reduction by a factor of about three.

I claim

1. Heat exchange means including a bundle of cylindrical members arranged with their longitudinal axes parallel, such that a fluid can be passed in heat exchange relationship over the surface of the cylindrical members, spacing means for spacing the cylindrical members transversely apart contacting between the cylindrical members, a support member being arranged longitudinally with respect to the cylindrical members said support member comprising a hollow body having an open end facing the direction of flow of fluid over the cylindrical members, at least one longitudinal wall of the support member being of flexible form, fluid flowing over the surface of the cylindrical members having access to the inside of the support member through the open end thereof the pressure of fluid acting on the inside of the flexible wall of the support member acting to apply a transverse loading on the cylindrical members whereby transverse support and location is provided for the cylindrical members.

2. Heat exchange means as claimed in claim 1 wherein the cylindrical members are arranged in an outer container, fluid being passed under pressure through the outer container in heat exchange relationship over the surface of the cylindrical members, said support member being in the form of a flexible cylindrical wall around the inside surface of the outer container and surrounding the bundle of cylindrical members, an interspace being defined between the support member and the inside surface of the outer container, the end of the interspace facing the direction of flow of fluid through the outer container being open for access of fluid into the interspace, the other end of the interspace being closed whereby the pressure of fluid acting in the interspace expands the flexible cylindrical wall of the support member radially inwards to cause it to contact the outermost cylindrical members of the bundle and thereby to exert an inwards force on the bundle.

3. A heat exchanger of the "tube-in-shell" type comprising a bundle of tubes arranged with their longitudinal axes parallel in an outer container and for effecting heat transfer between two flowing media, one flowing through the tubes and the other flowing over the tubes longitudinally through the outer container, the tubes in the bundle being spaced from one another by spacing means contacting between the tubes at spaced intervals along their length, a flexible member embracing the bundle of tubes and means for applying fluid pressure to said flexible member to cause it to contact the outermost tubes of the bundle and thereby to exert inward force on the bundle, whereby transverse support and location is provided for said tubes.

4. A heat exchanger of the "tube-in-shell" type as claimed in claim 3 wherein said flexible member is of annular form and is fitted around the inside surface of the outer container surrounding the bundle of tubes, an interspace being defined between the flexible member and the inside surface of the outer container, the end of the interspace facing the direction of flow of fluid through the outer container being open for access of said fluid into the interspace, the other end of the interspace being closed whereby the pressure of fluid acting in the interspace expands the flexible member radially inwards to cause it to contact the outermost tubes of the bundle and thereby exert an inwards force on the bundle.

5. A heat exchanger of the "tube-in-shell" type as claimed in claim 4 wherein the flexible member has longitudinal corrugations the outermost tubes of the cluster of tubes lying in the longitudinal corrugations of the flexible member.

6. A heat exchanger of the "tube-in-shell" type as claimed in claim 4 wherein a number of flexible members are provided inside the outer container and surrounding the bundle of tubes at spaced intervals along the length of the tubes each flexible member being positioned at a point where the spacing means make contact between the tubes.

7. A heat exchanger of the "tube-in-shell" type as claimed in claim 4 wherein the spacing means contacting between the tubes comprises ribs or projections on the tubes.

8. A heat exchanger of the "tube-in-shell" type as claimed in claim 4 wherein the spacing means contacting between the tubes comprises a wire wrap on the tubes.

9. A heat exchanger of the "tube-in-shell" type as claimed on claim 4 wherein the spacing means contacting between the tubes comprises dummy cylindrical members disposed between the tubes, spacing between the tubes and the dummy cylindrical members being by means of a wire wrap on the dummy cylindrical members.

* * * * *